(12) United States Patent
Shimrony et al.

(10) Patent No.: US 6,952,997 B2
(45) Date of Patent: Oct. 11, 2005

(54) INCINERATION PROCESS USING HIGH OXYGEN CONCENTRATIONS

(75) Inventors: Yoram Shimrony, Merkaz (IL); Zachary Bachmutzky, Yehud (IL)

(73) Assignee: Pure Fire Technologies Ltd., Beer Sheva (IL)

( * ) Notice: Subject to any disclaimer, the term of this patent is extended or adjusted under 35 U.S.C. 154(b) by 0 days.

(21) Appl. No.: 10/481,205

(22) PCT Filed: Jun. 24, 2002

(86) PCT No.: PCT/IL02/00503

§ 371 (c)(1),
(2), (4) Date: Dec. 18, 2003

(87) PCT Pub. No.: WO03/001113

PCT Pub. Date: Jan. 3, 2003

(65) Prior Publication Data

US 2004/0182292 A1 Sep. 23, 2004

(30) Foreign Application Priority Data

Jun. 26, 2001 (IL) .............................................. 143993

(51) Int. Cl.⁷ ............................. F23J 11/00; F23B 5/00; F23C 9/00; F23G 7/06
(52) U.S. Cl. ....................... 110/345; 110/208; 110/296; 110/346; 110/211; 110/186; 110/191; 110/348
(58) Field of Search ............................ 110/208, 295, 110/296, 297, 346, 211, 214, 185, 186, 191, 342, 343, 347, 348, 210, 345; 431/10

(56) References Cited

U.S. PATENT DOCUMENTS

| | | | |
|---|---|---|---|
| 3,306,235 A | 9/1967 | Lewis et al. | |
| 3,939,783 A | 2/1976 | du Chambon | |
| 4,286,548 A | 9/1981 | Brash | |
| 4,708,067 A | 11/1987 | Narisoko et al. | |
| 5,123,364 A | 6/1992 | Gitman et al. | |
| 5,179,903 A | 1/1993 | Abboud et al. | |
| 5,309,850 A | 5/1994 | Downs et al. | |
| 5,376,354 A | 12/1994 | Fischer et al. | |
| 5,402,739 A | 4/1995 | Abboud et al. | |
| 5,749,309 A * | 5/1998 | Forsberg et al. | ............ 110/346 |
| 5,752,452 A | 5/1998 | Leger | |
| 5,823,124 A | 10/1998 | Koppang | |
| 5,879,617 A | 3/1999 | Fuchs et al. | |
| 6,113,389 A | 9/2000 | Joshi et al. | |
| 6,286,443 B1 * | 9/2001 | Fujinami et al. | ............ 110/346 |

FOREIGN PATENT DOCUMENTS

WO    WO 96/240804    8/1996

* cited by examiner

*Primary Examiner*—Kenneth Rinehart
(74) *Attorney, Agent, or Firm*—Fitch, Even, Tabin & Flannery

(57) ABSTRACT

A process for incinerating combustible materials including the steps of: delivering combustible material and inlet gases to a primary combustion chamber, the inlet gases having an oxygen content of at least 50 vol %; burning the combustible material with the oxygen of the inlet gases in the primary combustion chamber producing flue gases and solid particulates as thermal decomposition products of the burnt combustible material; passing the flue gases and particulates to a secondary combustion chamber where further combustion occurs; cooling the flue gases exiting the secondary combustion chamber; returning a portion of the cooled flue gases to at least one of the combustion chambers where the cooled gases moderate the temperature in the at least one chamber; and passing the remaining portion of cooled flue gases on to a flue gas purification system where pollutants in the flue gases and particulates are substantially converted to benign compounds or removed entirely before the flue gases are emitted into the atmosphere.

35 Claims, 4 Drawing Sheets

INCINERATION PROCESS USING HIGH OXYGEN CONCENTRATIONS

The present application is a 35 USC 371 national phase application from and claims priority to international application PCT/IL02/00503, filed 24 Jun. 2002, established under PCT Article 21(2) in English, which claims priority to Israeli patent application Ser. No. 143993, filed 26 Jun. 2001, which applications are incorporated by reference herein.

FIELD OF THE INVENTION

The present invention relates to a method for incinerating combustible materials, particularly waste materials, including hazardous and bio-hazardous waste materials.

BACKGROUND OF THE INVENTION

The disposal of waste is a serious problem to governments, especially municipal governments. The waste disposal process is regulated by increasingly stricter standards since some wastes are toxic. In the case of industrial waste, there are even more problematic materials, such as petrochemicals, PCBs (polychlorinated biphenyls), etc. than in common, non-industrial waste. Additionally, medical and other biological waste is often hazardous and requires complete sterilization and decomposition.

Previously, other methods of waste disposal were more attractive than incineration. Landfills, for example, were used instead of incineration since the cost of disposing waste at a landfill was far less than that of incineration. However, increasingly more severe environmental standards have made landfills less attractive, primarily because of the increased awareness that toxic chemicals, over long periods of time, percolate through the ground contaminating aquifers. Similarly, the ever increasing quantity of waste make landfills and other methods physically impractical.

Accordingly, destructive, degradative processes such as incineration have become more popular. Destructive techniques like incineration must efficiently turn waste into innocuous end-products. This is a particularly acute problem in incineration where burning hazardous waste requires high temperatures so that the resulting decomposition products are environmentally benign. The high temperatures needed and the large quantities of waste involved require the development of incinerators that are economically and environmentally efficient. The emissions from such products are generally gaseous and must comply with standards set by international and governmental agencies. Similarly, solid and particulate wastes of incineration, such as slag, bottom ash and fly ash, must be neutered to remove harmful effects to the environment.

Examples of recently proposed incineration methods and incinerators can be found in U.S. Pat. Nos. 5,752,452 and 5,179,903, and WO 96/24804, Abboud. U.S. Pat. No. 5,179,903 and WO 96/24804 describe recycled flue gases which are augmented with oxygen, U.S. Pat. No. 5,752,452 describes a system with lances which inject oxygen into a heating zone at a velocity of at least 350 ft/sec.

However, despite improvements in incinerators and incineration processes, capital and maintenance costs are still very high. In addition, effluents emitted into the environment still require further reduction.

SUMMARY OF THE PRESENT INVENTION

An object of the present invention is to provide a process which maximizes the rate of incineration and throughput in waste incinerators while minimizing gas emissions and solid waste produced.

It is a further object of the present invention to provide an economical incineration process for use with industrial, consumer and biological wastes, including hazardous waste.

It is yet another object of the present invention to minimize the size of the required incinerator and flue gas purification system, thereby minimizing the required investment and maintenance costs.

A further object of the present invention is to provide an economical, environmentally friendly process which can be applied to large industrial installations, such as electricity generating plants, which burn large quantities of fossil fuels.

There is thus provided in accordance with the present invention a process for incinerating combustible material including the step of delivering combustible material and inlet gases to a primary combustion chamber, the inlet gases having an oxygen content of at least 50 vol. %. This is followed by burning the combustible material with the oxygen of the inlet gases in a primary combustion chamber producing flue gases and solid particulates as thermal decomposition products of the burnt combustible material. The flue gases and particulates are then passed to a secondary combustion chamber where further combustion occurs. The flue gases exiting from the secondary combustion chamber are cooled. A portion of the cooled flue gases is returned to at least one of the combustion chambers where the cooled gases moderate the temperature in the at least one chamber. Finally, the remaining portion of the cooled flue gases is passed on to a flue gas purification system where pollutants in the flue gases and particulates are substantially converted to benign compounds or removed entirely before the flue gases are emitted into the atmosphere.

Additionally, there is provided in accordance with the present invention a process which further includes the step of monitoring the value of at least one parameter in at least one combustion chamber, the parameter being a function of the thermal decomposition of the combustible material in at least one combustion chamber. This is followed by comparing the value of the at least one monitored parameter with at least one predetermined value for that parameter, the comparison being effected by a control device. Finally, the result of the comparison is communicated to a means for controlling the portions of cooled flue gases returned to the at least one combustion chamber and the flue gas purification system. The means for controlling the portions adjusts the relative sizes of the two portions accordingly.

Additionally, in accordance with a preferred embodiment of the present invention the at least one parameter in the monitoring step is temperature. The temperature can be monitored in the primary combustion chamber or in the secondary combustion chamber or in both chambers.

Further, in accordance with a preferred embodiment of the present invention, the at least one parameter in the monitoring step is the concentration of carbon monoxide or the concentration of oxygen or the concentration of both simultaneously. These concentrations can be measured in the effluent of the secondary combustion chamber.

In accordance with a preferred embodiment of the present invention, the means for controlling the amount of cooled gases are valves.

Additionally, in accordance with a preferred embodiment of the present invention, the inlet gases of the delivering step are delivered in two high concentration oxygen streams, one inlet gas stream positioned adjacent to the burning waste and the other above the flames of the burning waste, the amount of oxygen from each stream controlled so that the temperature of the burning waste is maintained at a temperature that does minimal damage to the floor of the primary combustion chamber, while ensuring complete combustion of the waste and an oxygen volume % in the system's effluent within regulatory limits.

Further, in accordance with a preferred embodiment of the present invention the oxygen content of the inlet gases is at least 80 vol. %.

Additionally, in a preferred embodiment of the present invention, the oxygen content of the inlet gases is at least 90 vol. %.

Further, in a preferred embodiment of the present invention, the oxygen content of the inlet gases is between about 90 vol. % and 95 vol. %.

Additionally, in accordance with a preferred embodiment of the present invention, the burning step in the primary combustion chamber is effected at a temperature from about 1100° C. to about 2000° C.

In another preferred embodiment of the present invention, the burning step in the primary combustion chamber is effected at a temperature from about 1200° C. to about 1750° C.

Additionally, in a preferred embodiment of the present invention, the burning step in the primary combustion chamber is effected at a temperature from about 1300° C. to about 1500° C.

Further, in yet another embodiment of the present invention, combustion in the secondary combustion chamber of the first passing step is effected at a temperature from about 850° C. to about 1500° C.

In another embodiment of the present invention, combustion in the secondary combustion chamber of the first passing step is effected at a temperature from about 950° C. to about 1350° C.

Additionally, in yet another embodiment of the present invention, combustion in the secondary combustion chamber of the first passing step is effected at a temperature from about 1050° C. to about 1200° C.

In another embodiment of the present invention, the process further includes the step of adding at least one reduced nitrogen compound into the second combustion chamber to destroy nitrogen oxide gases. Typically, the at least one reduced nitrogen compound can be ammonia or urea.

Further, in a preferred embodiment of the present invention, the process further includes the step of separating solid particulates from the flue gases after the gases are cooled.

Additionally, in a preferred embodiment of the invention, the at least one combustion chamber of the returning step is the primary combustion chamber.

Finally, in a preferred embodiment of the present invention, the cooled flue gases are returned to the primary combustion chamber proximate to the flame produced by burning combustible material in that chamber. In another embodiment, the cooled flue gases are returned to the primary combustion chamber proximate to the bottom ash and slag.

In yet another preferred embodiment of the present invention, the at least one combustion chamber of the returning step is the secondary combustion chamber.

Finally, the present invention can be used with combustible material which is waste, including hazardous waste, or fuels.

BRIEF DESCRIPTION OF THE DRAWINGS

The present invention will be understood and appreciated more fully from the following detailed description taken in conjunction with the drawings in which.

Similar elements in the Figures are numbered with similar reference numerals.

DETAILED DESCRIPTION OF PREFERRED EMBODIMENTS

Figure 1:
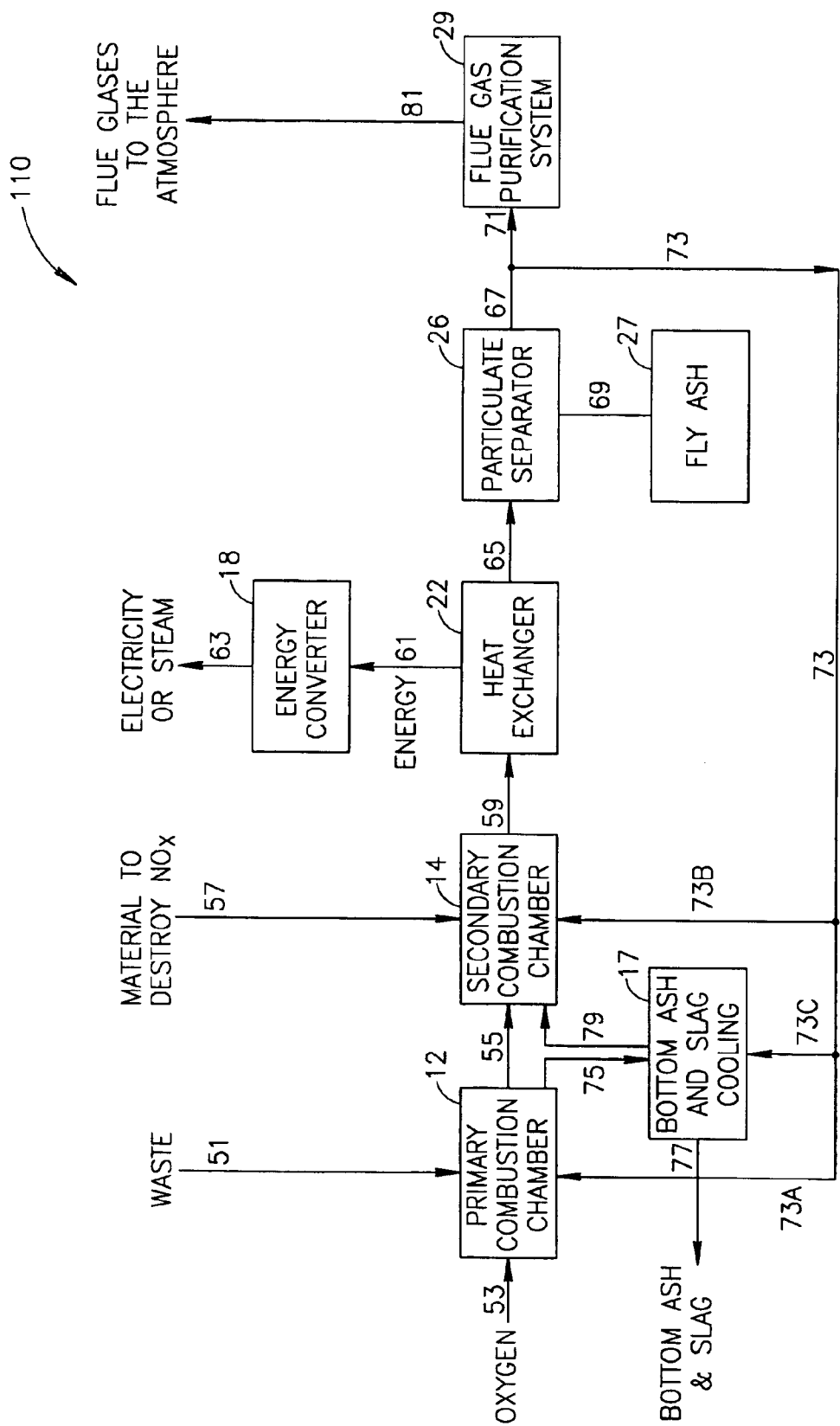
FIG. 1 is a flow diagram illustrating a preferred embodiment of the process of the present invention.

Reference is now made to FIG. 1, which shows a flow diagram of a preferred embodiment of an incineration process generally referenced 110, in accordance with the present invention. Process 110 is particularly preferred when used to incinerate industrial, commercial and/or biological waste. The description herein below, as well as the accompanying Figures, describe the process in terms of such waste. However, while the above process 110 has been discussed as a process for the incineration of waste, the system can also be used to burn any fuel, producing energy in a clean, cost efficient manner. In lieu of municipal or industrial waste, process 110 can be used to burn fuels such as natural gas, fuel oil, and coal. These fuels, however, are to be viewed as non-limiting examples.

Process 110 includes a primary combustion chamber (PCC) 12 into which waste is fed 51 via a conduit (not shown). Inlet gases containing at least 50 vol. %, preferably at least 80 vol. %, and most preferably at least 90 vol. % oxygen, usually between about 90 vol. % to 95 vol. % oxygen, are also passed 53, via a conduit (not shown), into PCC 12, typically in the region immediately proximate to the burning waste. The waste is burned in an excess of the stoichiometric amount of oxygen. The waste is burned in PCC 12 at temperatures maintained between about 1100 to 2000° C., preferably between about 1200 to 1750° C., and even more preferably between about 1300 to 1500° C. Because of the high oxygen concentrations used in primary combustion chamber 12, a significant percentage of the material burned undergoes complete oxidation. Oxygen lancing and other methods to introduce supplementary oxygen are therefore not required.

Flue gases mixed with small solid particulates resulting from incineration rise from PCC 12 and pass 55, via a conduit (not shown), into a secondary combustion chamber (SCC) 14. Partially combusted flue gases are further combusted in SCC 14 to more completely oxidized gases using the residual oxygen arriving from PCC 12. In SCC 14, the temperature is maintained within the range of from about 850 to 1500° C., preferably from about 950 to 1350° C., and even more preferably from about 1000 to 1200° C.

Optionally, materials which destroy nitrogen oxide gases (NOx) are fed 57, via a conduit (not shown), into SCC 14. Typically, these materials are reduced nitrogen compounds such as ammonia or urea which convert the NOx gases formed in PCC 12 and SCC 14 into nitrogen and water. Since the amount of nitrogen comprising the inlet gases passed 53, via a conduit (not shown), into PCC 12 is small, the amount of NOx present in the system is not great. In some embodiments, the materials which destroy nitrogen oxide gases may be employed without a catalyst; in other embodiments, a catalyst may be required. Preferably, PCC 12 and SCC 14 are contained in a single structure, but each can be located in separate structures, when necessary.

The flue gases are conveyed 59 via a conduit (not shown) to a heat exchanger 22. Typically, heat exchanger 22 may be a boiler which removes heat from the flue gases. The energy removed, usually as steam, is conveyed 61, via a conduit (not shown), to an energy converter 18, often a turbogenerator. Alternatively, any heat recovery system from which electricity or steam can be withdrawn 63 can be employed. Any electricity generated or steam removed can be returned to the incineration plant or distributed to outside consumers.

After emerging from heat exchanger 22, the flue gases have a temperature of about 230 to 270° C., preferably about 250° C. The gases are transferred 65 via a conduit (not shown) to a particulate separator 26, typically a cyclone separator, which via a conduit (not shown), removes 69 fly ash 27 from the flue gases. The removed fly ash 27 is collected, "bagged" and sent to a toxic waste disposal site. The use of a particulate separator 26 at this stage of process 110 is optional. Alternatively, particulates can be removed exclusively in flue gas purification system 29 discussed below. As another alternative, purification system 29 can include a particulate remover which supplements particulate separator 26.

Two valves (not shown) located between particulate separator 26 and flue gas purification system 29 divide the flue gases into two portions. The percentage of flue gas that is recycled 73 through a conduit (not shown) and the percentage of flue gas passed 71 via a conduit (not shown) directly on to a flue gas purification system 29 for further purification is determined by some parameter(s) of PCC 12 and/or SCC 14. Typically, the parameter is its (their) temperature(s) or the concentration of carbon monoxide and/or oxygen on the downstream side of SCC 14.

The flue gases that are passed on 71 via a conduit (not shown) for further purification reach flue gas purification system 29, details of which are not shown. The exact nature of purification system 29 depends on the waste being incinerated, the gases and particulates emitted, and the environmental standards which must be met. Typically, flue gas purification system 29 contains a particulate remover, which supplements optional particulate separator 26, discussed above, and sometimes serves as the sole particulate remover in process 110. Generally, the particulate remover in purification system 29 traps finer particles than optional particulate separator 26. Typically, purification system 29 also contains a scrubber to neutralize acid gases. Other apparatuses commonly used for purifying effluent gases can be added as needed to attain the required effluent emission standards before the gases are expelled 81 to the atmosphere.

Another portion of the flue gases is recycled 73 via a conduit (not shown) to PCC 12. Typically, the recycled, cooled flue gases are returned 73A via a conduit (not shown) to PCC 12 directly above the flame, thereby removing heat from PCC 12 and transferring it to heat exchanger 22 via SCC 14. In another embodiment, the recycled flue gases can be returned 73B via a conduit (not shown) directly to SCC 14. In yet another embodiment, the flue gases can also be recycled 73C via a conduit (not shown) through bottom ash and slag 17 lying at the floor of PCC 12. Finally, in other embodiments, the cooled flue gases can be returned to both PCC 12 and SCC 14. Because PCC 12 operates at temperatures in excess of 1300° C., the bottom ash becomes vitrified 75 when cooled. Some ash is carried 79 by convection to SCC 14. Cooled slag and vitrified bottom ash 17 are periodically removed 77 to a slag and bottom ash receptacle (not shown) for disposal.

Figure 2A:
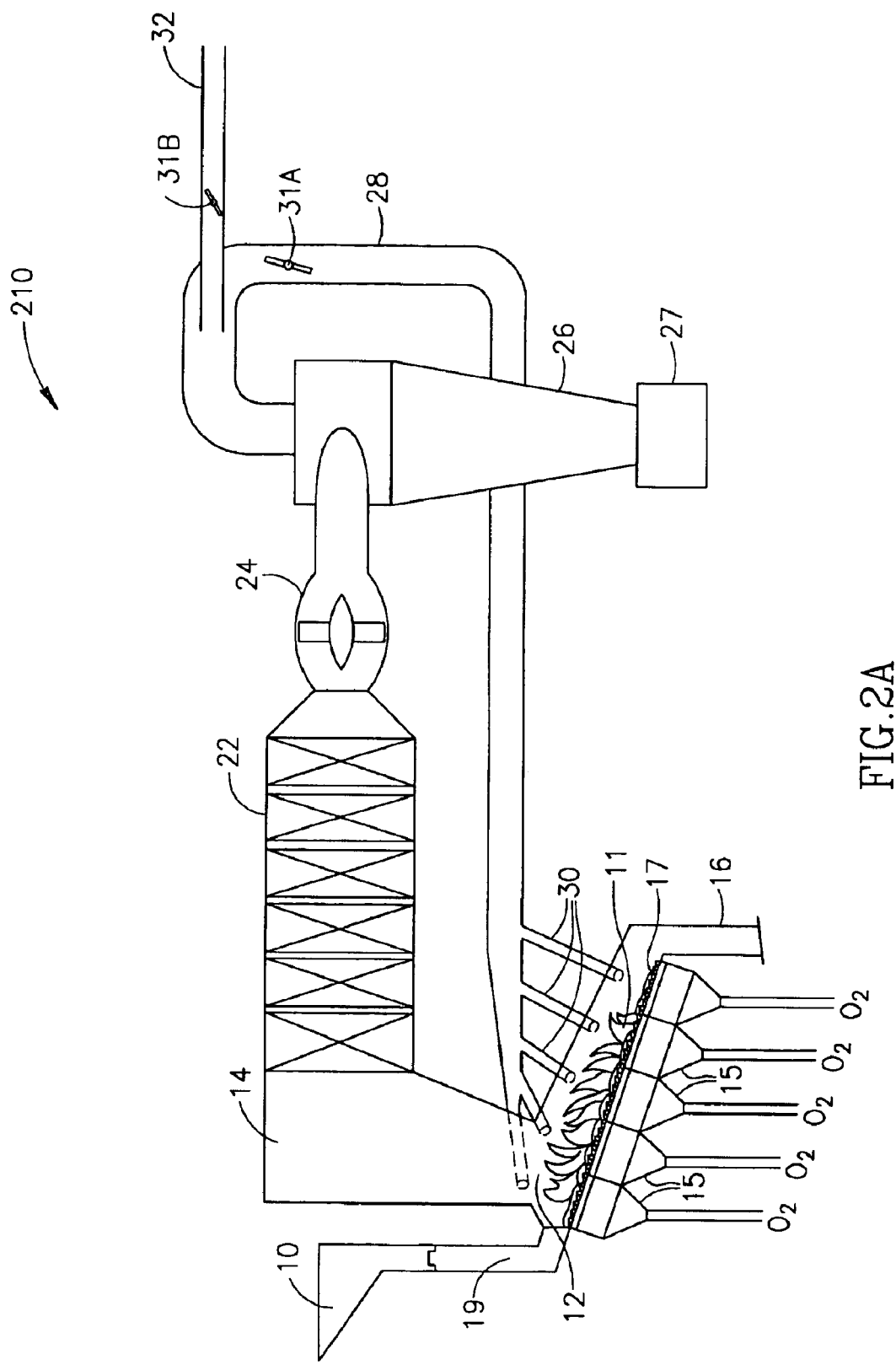
FIG. 2A is a schematic view of an incinerator operative in accordance with the present invention.

Reference is now made to FIG. 2A which shows a schematic view of an incinerator system 210 operated in accordance with the process 110 of the present invention shown in FIG. 1. The system 210 permits a better understanding of process 110 presented in FIG. 1. The system shown in FIG. 2A, however, is presented by way of example only and should not be considered as limiting.

System 210 includes a primary combustion chamber 12 into which waste 19 is fed from a waste feed 10. There is an inlet gas feed array 15 which delivers inlet gases for combustion, the gases typically being composed of at least 90 vol. % oxygen. Waste 19 is burned in primary combustion chamber (PCC) 12. The inlet gases are brought from array 15 proximate to the burning waste in PCC 12. The high concentration of oxygen in the inlet gases fed to primary combustion chamber 12 accelerates the rate of combustion of waste 19. The temperature in PCC 12 is also significantly higher than temperatures generated when air alone is used. The higher temperatures attained easily crack and shatter solids, facilitating their incineration. Materials that do not burn in air, or do so only incompletely, burn easily in inlet gases with a high oxygen content, often to near completion. Since the oxygen concentration used in the process of the present invention is so high, burning is much more complete and there is no need for selectively introducing lanced oxygen. Because the rate of combustion is faster than in currently used incinerators, primary combustion chamber 12 can be made smaller while throughput will be greater than in prior art incinerators.

PCC 12 has a bottom grating comprised of slats, which are preferably adapted to be rotatable or otherwise movable so as to rotate or otherwise agitate the burning waste. The grating can be made from, or covered with, ceramic materials which protect it from the elevated temperature of combustion. Typically, every other grating slat is moved periodically, turning over the burning waste, permitting more thorough and rapid combustion. The lower parts of the walls of PCC 12 must also be protected from the heat, usually using ceramic tiling as shields. Alternatively, the walls and the grating can be cooled with water flowing through adjacent water pipes. It is readily apparent to one skilled in the art that instead of grating slats at the bottom of primary combustion chamber 12, the floor of chamber 12 can include rotating metal cylindrical rollers or any other means that can periodically move and/or rotate the burning waste.

Slag and bottom ash 17 from PCC 12 are cooled and emptied into an ash and slag receptacle (not shown) via a slag channel 16. Because of the high temperatures (>1300° C.) in the primary combustion chamber 12, the bottom ash 17 is vitrified when cooled and encapsulated in a glass-like crust. The encapsulation insulates and neutralizes harmful materials making them usable for civil engineering projects such as road beds without the need for further processing.

Gases and fly ash emitted from the burning waste as well as residual oxygen from PCC 12 enter a secondary combustion chamber 14 where additional combustion occurs. An array 30 of nozzles in the wall of primary combustion chamber 12 injects cooled, recycled flue gases into PCC 12; typically these recycled gases enter PCC 12 immediately above flames 11. The cooled, recycled flue gases entering from array 30 have a typical temperature of approximately 250° C. and they maintain the temperature in primary combustion chamber 12 at a predetermined temperature, generally about 1300 to 1500° C. Similarly, they cool the gases rising from PCC 12 into SCC 14 to temperatures between about 1000 to 1300° C.

Optionally, ammonia or urea are added to the flue gas in SCC 14 reducing the nitrogen oxide gases produced in PCC 12 and SCC 14 to nitrogen and water. PCC 12 and SCC 14 can be constructed as any one of several types of chambers, such as rotary kiln, fixed hearth or other types of ovens.

The gases continue on from secondary combustion chamber 14 to an heat exchanger 22, typically a boiler. Heat exchanger 22 removes heat from the flue gases, generally forming steam which is led to a turbogenerator (not shown). The turbogenerator can be connected to an electric grid from which electricity can be delivered directly to consumers or returned to the incineration plant for use within the plant. Alternatively, the steam itself, or a mixture of steam and electricity generated by the heat exchanger/boiler 22 and turbogenerator (not shown) respectively, can be sold. By the time the gases and fly ash emissions from the burnt waste reach an optional blower 24, the temperature of the gases has been reduced to approximately 250° C.

The fly ash that passes through optional blower 24 enters an optional cyclone separator 26 which precipitates the bulk of the fly ash passing through blower 24. The cyclone separator 26 may be any cyclone separator commercially available used to separate particulates from gases. A single cyclone or multiple cyclones can be used.

It should be noted that there is a significant reduction in the amount of fly ash produced by the process of the present invention. The reduction in fly ash is a direct consequence of the very high percentage of oxygen introduced with the inlet gases. The high percentage of oxygen reduces the total amount of inlet gases provided to primary combustion chamber 12, which in turn leads to a smaller volume of carrier gas for ash generated by incineration. More of the ash produced remains as bottom ash. Since fly ash traps poisonous materials found in flue gases, such as dioxins and heavy metals, the law requires that fly ash be gathered and delivered to a toxic disposal dump. Any reduction in fly ash therefore results in a reduction in waste treatment expense.

The bulk of the emitted waste gases, the flue gas, is returned via a recycling line 28 to primary combustion chamber 12. The recycled flue gas is at a temperature of approximately 250° C. and enters PCC 12 through array 30 in the wall of primary combustion chamber 12. Generally, the gases enter the chamber proximate to and above flames 11. The cooled recycled flue gas functions as a coolant keeping the temperature in primary combustion chamber 12 at the predetermined temperature, typically 1300–1500° C. Typically, the recycled flue gases reenter the system directly into PCC 12 above flames 11 therein; optionally they can also be recycled directly to SCC 14 or into the bottom ash and slag 17 on the floor of PCC 12. Typically, an array of conduits is used for reintroducing the recycled flue gas, but in other embodiments, a single point of entry for the recycled flue gases may be employed.

Part of the flue gases from blower 24 enters a cleaning line 32. Valves 31A and 31B determine how much, and when, flue gases enter cleaning line 32 and recycling line 28. Using 90 vol. % oxygen and a typical mix of Israeli municipal waste, the mixture of flue gases generated and entering these lines has a typical approximate composition of oxygen 6 vol. %, nitrogen 5 vol. %, $CO_2$ 43 vol. % and steam 46 vol. %.

If the inlet gases fed to primary combustion chamber 12 had been air (approximately 21 vol. % oxygen) and not a gas mixture containing at least 90 vol. % oxygen, the nitrogen content of the flue gases entering cleaning line 32 and recycling line 28 would have risen to approximately 66 vol. %.

Valves 31A and 31B are connected to a control system which monitors a parameter, typically the temperature, of the gases exiting primary combustion chamber 12 and/or secondary combustion chamber 14. If the temperature is higher than required, a larger percentage of the flue gases is recirculated to the primary combustion chamber; if the temperature in the primary combustion chamber is lower than required, the amount of flue gases that is returned is decreased. If, for example, the temperature in PCC 12 is 1750° C. and the temperature in SCC 14 is 1100° C., the approximate percentage of flue gases recycled is 60 vol. % while 40 vol. % are passed via line 32 directly to the flue gas purification system 310 shown in FIG. 2B and discussed below.

Typically, a device, for example a thermocouple, is used to measure the temperature inside PCC 12 and/or SCC 14, while a temperature controller compares the measured PCC 12 and SCC 14 temperatures, with one or more temperature set points. The controller then opens or closes the two valves accordingly, returning the required amount of recycled flue gases to PCC 12 and/or SCC 14. The recycling of cooled flue gases ensures better control of temperature in primary combustion chamber 12 than when recycling is absent. It also increases the degree of combustion of the flue gases.

Figure 2B:
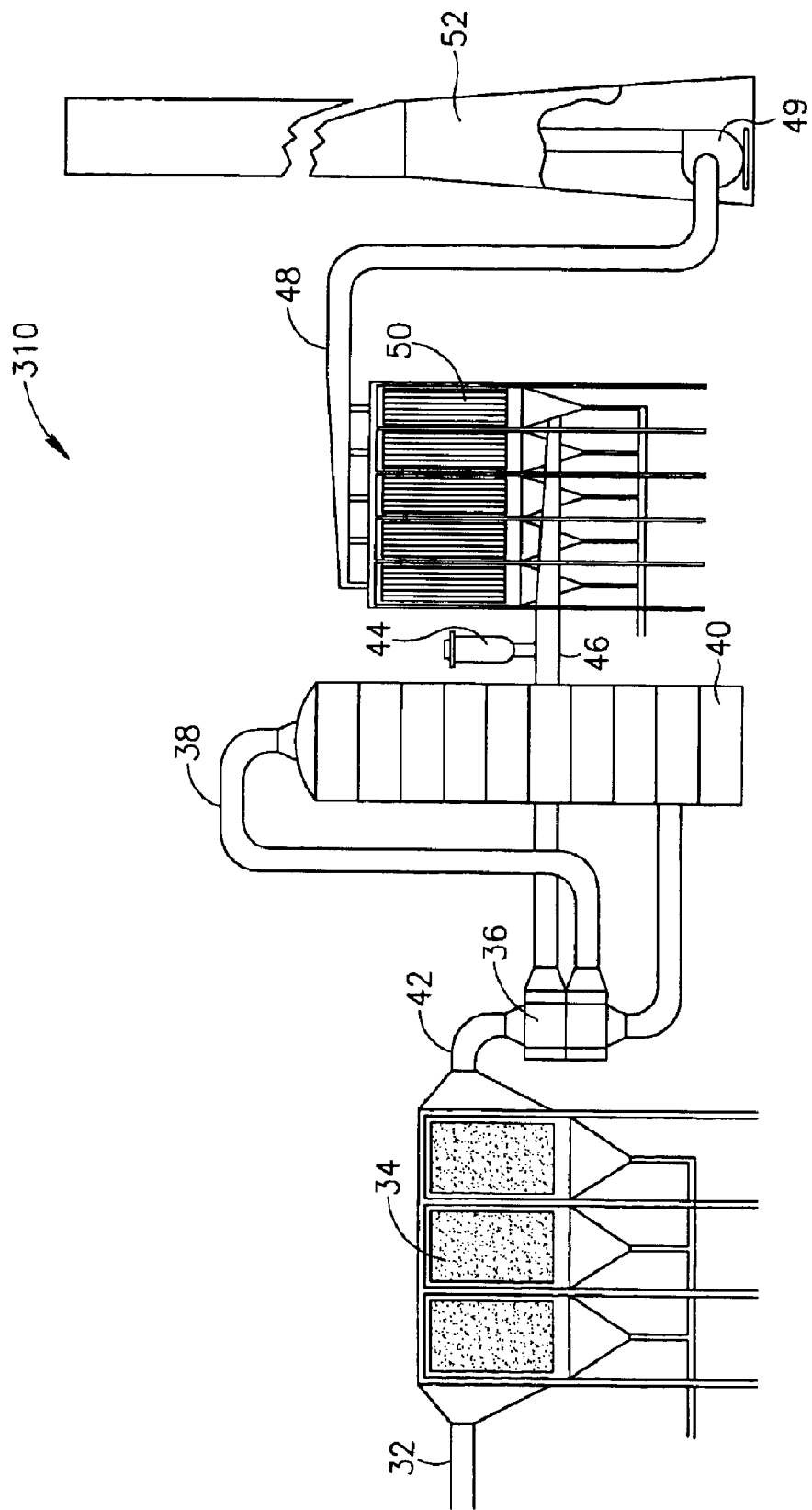
FIG. 2B is a schematic view of a typical purification system which can be used with an incinerator operative in accordance with the present invention.

Reference is now made to FIG. 2B, where a schematic view of an exemplary purification and scrubbing system 310 of the incinerator plant is shown. The configuration of devices in FIG. 2B are shown merely by way of example and the scope of the present invention is not intended to be limited thereby.

Cleaning line 32 continues into the purification system 310 of the plant where the amount of effluent solid and flue gases is reduced. These gases and solids are led into an electrostatic precipitator (ESP) 34 which complements or functions in place of cyclone separator 26 discussed above. In ESP 34 much of the remaining fly ash is removed. In ESP 34, fly ash particulates are charged by a high voltage source and drawn to a conductive plate of opposite charge where the particulate's charge is dissipated. The ash is then precipitated and collected.

The flue gases are then sent via a line 42 to a scrubber heat exchanger 36 which removes heat from the system. The gases enter the lower part of a scrubber 40 where the temperature is less than 100° C. and much of the water vapor in the flue gases condenses. In scrubber 40, drops of a basic solution containing calcium hydroxide, sodium hydroxide, sodium carbonate, potassium carbonate or some other such alkaline compound are injected. These neutralize acid gases such as sulfur dioxide and any residual nitrogen oxides not destroyed by ammonia or urea optionally added in secondary combustion chamber 14. The scrubbed gases then reenter heat exchanger 36, via a line 38, where they are reheated using the heat previously withdrawn from the flue gases before these gases entered the lower part of scrubber 40. The reheated gases then enter a line 46, where an activated carbon injector 44 injects carbon into line 46, so that contaminants, among them dioxins and furans, are adsorbed. The carbon also traps other contaminants including heavy metal and heavy metal oxide particulates.

The injected activated carbon and gas effluents advance through line 46 and are deposited onto a fabric filter 50, which removes the injected active carbon from the flue gases. Residual gases such as oxygen and nitrogen are then led through a line 48 to a stack 52 where they are emitted into the air, usually with the assistance of a blower 49 located at the bottom of the stack.

When the inlet gases contain at least 90% oxygen, the amount of effluent gases emitted from stack 52 is about 5 times less than the amount emitted by currently used incinerators. Typically, approximate percentages of the emitted gases using the process of the present invention are 6 vol. % oxygen, 5 vol. % nitrogen, 20 vol. % water vapor and 70 vol. % carbon dioxide.

The reduction in nitrogen and the large amount of completely oxidized carbon in the form of carbon dioxide are a direct result of the use of inlet gases with a very high oxygen content followed by recycling of flue gases into the primary combustion chamber. The reduction in water vapor is a consequence of the condensation of a large percentage of the vapor in scrubber 40 discussed above.

It should be apparent to one skilled in the art that the exact configuration of devices used to clean the effluent after it enters cleaning line 32 is to a degree variable and/or optional. Other types of scrubbers and filters known in the art can be used. Similarly, some of the devices discussed above may be absent entirely while others not shown can be added. Cleaning devices at different plants would be expected to vary depending on the nature of the waste being burned and the environmental standards which must be met.

The inlet gases used to burn waste in primary combustion chamber 12 of the process discussed herein above should typically contain at least 80 vol. %, preferably at least 90 vol. %, but generally between 90 vol. % and 95 vol. %, oxygen. This level of oxygen content (90–95 vol. %) is readily attained by using a vapor pressure swing adsorption (VPSA) device, such as the one produced by Praxair Inc. A VPSA device absorbs nitrogen from air and passes the rest of the gases, mainly oxygen, to primary combustion chamber 12 at relatively low cost. VPSA separates nitrogen from air by molecular sieving. Nitrogen is adsorbed at low pressures in the sieve and then removed by vacuum. Presently, this method is the most economical way to obtain gas fractions having such high percentages of oxygen. Any attempt to use higher concentrations of oxygen to increase the performance of the incinerator would increase the cost of producing the inlet gas because it would require distillation of liquefied air.

The use of VPSA as discussed above or, alternatively, the related pressure swing adsorption (PSA) process to produce inlet gases containing a high percentage of oxygen should be viewed as non-limiting. Devices employing membrane technology also can be used to produce inlet gases with higher than atmospheric oxygen content but these typically are only 40 to 60 vol. %.

Since there is likely to be a reduction by a factor of about 5 in effluent gases at the incinerator's stack when the inlet gases of the incinerator include at least 90% oxygen (based on absolute amount of weight per ton of waste), there is a concomitant reduction in the size and cost of the apparatus required to clean up effluent gases. Similarly, costs of the incinerator are reduced because of the faster combustion and higher throughput. In addition, because of the reduction in fly ash and the vitrification of bottom ash in the system, waste disposal costs are reduced. Finally, because nitrogen forms a much smaller portion of the inlet gases, energy lost in heating nitrogen is reduced. This energy may be retrieved for profitable use elsewhere.

Figure 3:
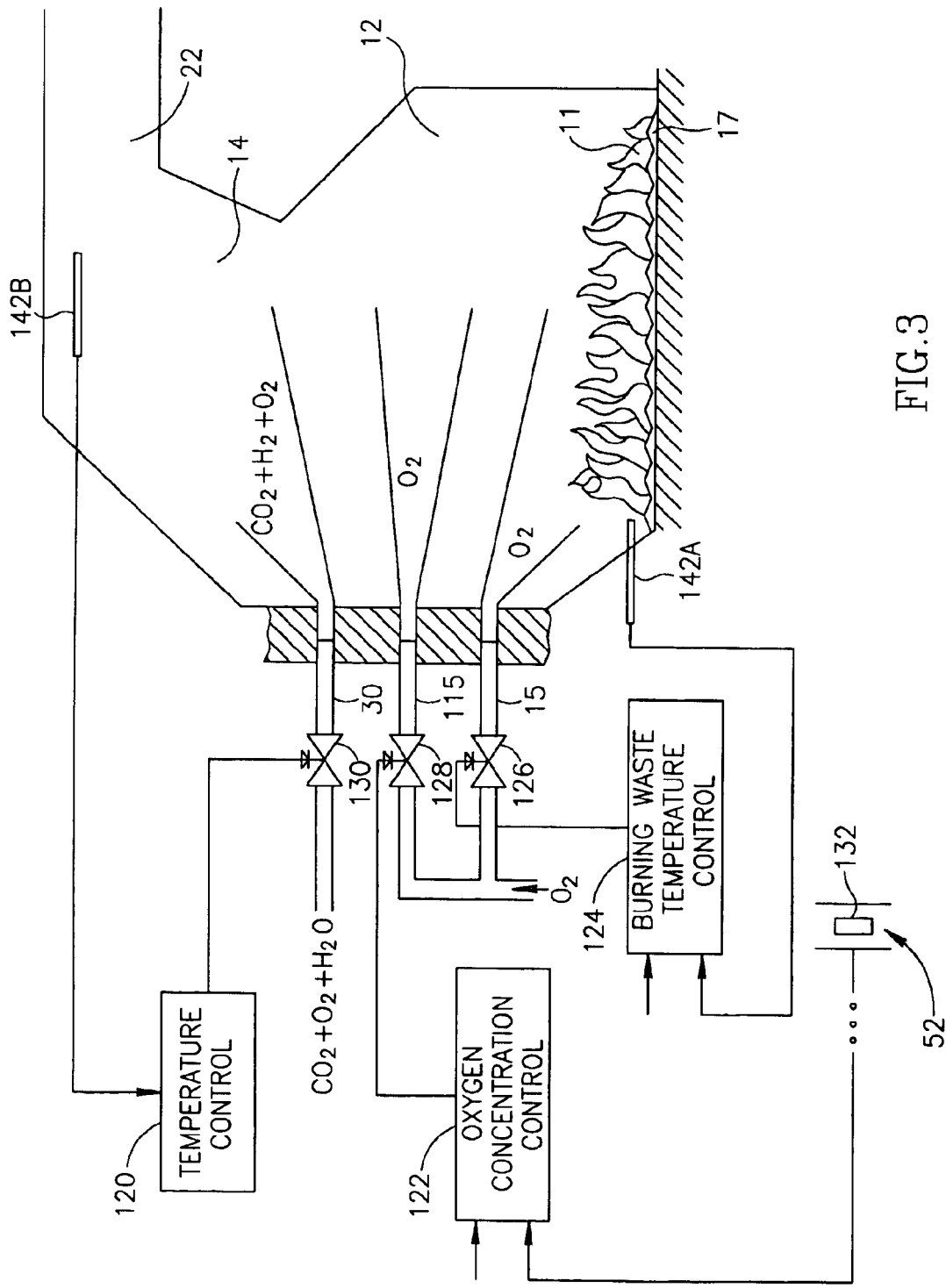
FIG. 3 is a schematic diagram illustrating another preferred embodiment of the process of the present invention.

Reference is now made to FIG. 3 which schematically shows another embodiment of the present invention. FIG. 3 includes a primary combustion chamber (PCC) 12, a secondary combustion chamber (SCC) 14, and their control systems 120, 122 and 124. It also includes an inlet gas feed array 15, an auxiliary inlet gas feed array 115 and a recycled gas flue array 30, positioned in the aforementioned chambers.

In this, as in previous embodiments, a high oxygen concentration is fed into PCC 12 proximate to the burning waste at the floor of PCC 12. Oxygen is delivered through inlet gas feed array 15, which, because of the high concentration of oxygen delivered, generates very high temperatures near the burning waste 11. These temperatures may adversely effect the structure of PCC 12 and can require different, more heat resistant, more costly materials from which to construct PCC 12.

In order to reduce combustion temperatures in the bottom region of PCC 12, the present embodiment contemplates limiting the total amount of oxygen supplied to the primary chamber by inlet gas feed array 15. Limiting the oxygen introduced by array 15, but not the high concentration of the oxygen, reduces the temperature at, or near, the floor of PCC 12.

With the reduction in total amount of oxygen introduced through inlet gas feed array 15, some waste, and the flue gases generated therefrom, may be incompletely oxidized. In order to ensure that all the waste and flue gases are substantially completely burned, there is positioned in PCC 12 a second gas feed array carrying a high concentration of oxygen to PCC 12. This second array, herein denoted as an auxiliary inlet gas feed array 115, supplies a high concentration of oxygen, typically in excess of 90%, over the burning coals and into the flue gases rising therefrom. The oxygen fed through auxiliary inlet gas feed array 115 produces substantially complete combustion of the flue gases generated by the burning waste in PCC 12, while permitting operation of PCC 12 at lower temperatures. Even if oxygen provided by auxiliary inlet gas feed array 115 increases the temperature of the exiting flue gases, little increase in temperature results in the burning waste adjacent the floor of PCC 12 and little damage to the floor of PCC 12 occurs.

The temperature of the exiting flue gases is moderated by recycled gases introduced from an array of nozzles 30 through valves 130, the nozzles generally located in the wall of SCC 14 or in the upper region of PCC 12. The temperature of the exiting flue gases is measured by a thermocouple, pyrometer or other temperature monitoring instrument 142B connected to a temperature control unit 120 which controls the operation of valves 130.

Using two high concentration oxygen sources, inlet gas feed array 15 and auxiliary inlet gas feed array 115, allows for substantially complete combustion of the waste at generally lower temperatures in, or proximate to, the burning waste located at, or near, the bottom of PCC 12.

The amounts of oxygen brought into PCC 12 and needed to maintain relatively low combustion temperatures there can be controlled in several ways. Temperature control can be effected by monitoring the oxygen concentration in the effluent emerging from the system's stack 52. As described above, flue gas concentrations entering the atmosphere must meet strict regulatory requirements. An oxygen monitoring instrument 132 can be inserted into, or positioned near, the outlet of stack 52 to monitor the oxygen vol. % of the effluent. Data relating to the concentrations thus measured are then fed to an oxygen concentration control unit 122.

When the oxygen concentration in the effluent emerging from stack 52 is lower than required by regulations, the amount of oxygen provided by auxiliary oxygen feed array 115 is increased; when the amount of oxygen is higher than required by regulations, the amount of oxygen supplied by auxiliary oxygen feed array 115 is reduced.

As an alternative to an oxygen monitoring instrument 132 positioned at the outlet of stack 52, oxygen can be monitored by measuring oxygen content of the recycled gases delivered by recycled gas flue array 30 and entering either PCC 12 or SCC 14. The percentage oxygen content at stack 52 is related to the oxygen content in the recycled gases arriving from recycled gas flue array 30. Therefore, the composition of the recycled gases entering either PCC 12 or SCC 14 can be used to determine the over or under abundance of oxygen at stack 52.

In yet other embodiments of the present invention, two oxygen monitoring instruments can be used to determine the oxygen content exiting stack 52. One instrument 132 can be positioned at stack 52 while the other can be located at the point where recycled flue gases are delivered by array 30.

An alternative method for controlling the system is by monitoring the temperature in PCC 12. At least one thermocouple or pyrometer 142A is placed near, or at, the flames 11 of the burning waste. The results of these temperature measurements then are fed into a control unit 124, the burning waste temperature control unit, and compared to a predetermined temperature setting. The amount of oxygen provided to PCC 12 by both gas inlet arrays 15 and 115 then is adjusted to maintain a predetermined temperature setting at flames 11 by operating valves 126 and 128, respectively. By controlling temperature, the effluent oxygen concentration at stack 52 is also kept within regulatory limits.

It should be readily apparent to one skilled in the art that there is a reciprocal relationship between the amount of oxygen being supplied through valves 126 and 128 of inlet gas feed array 15 and auxiliary inlet gas feed array 115, respectively. When more oxygen is required at array 15, generally less oxygen is required at array 115 for a given required flame temperature.

When the temperature of the burning material is too high, valve 126, controlled by burning waste temperature control unit 124, reduces the flow of oxygen from inlet gas feed array 15 above the burning coals. Control unit 124 is separate from another control unit, the temperature control unit 120, which monitors temperature at the exit of the secondary combustion chamber (SCC) 14. This temperature, as discussed above, is effected by means of two valves 31A and 31B (FIG. 2A) which determine the amount of recycled cooled flue gases returned to PCC 12 and SCC 14 or sent to stack 52 by recycling line 28 (FIG. 2A) or cleaning line 32 (FIG. 2A), respectively.

It can readily be seen that the temperature of the burning coals as measured by measuring instrument 142A and controlled by control unit 124 through valve 126 and gas feed array 15, the oxygen monitoring instrument 132 at stack 52 and its oxygen control unit 122 through valve 128 and auxiliary gas feed array 115, and temperature monitoring instrument 142B through temperature control unit 120 and valve 130 of recycled flue gas array 30 form three control loops which are functionally interconnected. Generally, changes in one have a discernible effect in the other two control loops.

The embodiment shown in FIG. 3 moderates and controls temperature better than in currently available furnaces. This embodiment with its auxiliary oxygen feed array 115 and recycled flue gas array 30, the latter positioned either in the walls of secondary combustion chamber (SCC) 14 or the upper region of PCC 12, permits moderation of the temperature at every stage of the combustion process. Furnace temperatures, irrespective of the type of the furnace used, can be maintained so that damage to PCC 12 is minimized.

It will be appreciated by persons skilled in the art that the present invention is not limited by what has been particularly shown and described herein above. Rather the scope of the invention is defined solely by the claims that follow.

What is claimed is:

1. A process for incinerating combustible material including the steps of:

delivering combustible material and inlet gases to a primary combustion chamber, the inlet gases having an oxygen content of at least 50 vol. %;

burning the combustible material with the oxygen of the inlet gases in the primary combustion chamber producing flue gases and solid particulates as thermal decomposition products of the burnt combustible material;

passing the flue gases and particulates to a secondary combustion chamber where further combustion occurs;

cooling the flue gases exiting the secondary combustion chamber;

returning a portion of the cooled flue gases to at least one of the combustion chambers where the cooled gases moderate the temperature in the at least one chamber;

passing the remaining portion of cooled flue gases on to a flue gas purification system where pollutants in the flue gases and particulates are substantially converted to benign compounds or removed entirely before the flue gases are emitted into the atmosphere;

monitoring the value of at least one parameter of at least one combustion chamber, the parameter being a function of thermal decomposition of the combustible material in at least one combustion chamber;

comparing the value of the at least one monitored parameter with at least one predetermined value, the comparison being effected by a control device; and communicating the result of the comparison to a means for controlling the portion of cooled flue gases returned to the at least one combustion chamber in said step of returning and to the flue gas purification system in said step of passing the remaining portion of cooled flue gases, the means controlling the size of the portions accordingly.

2. A process according to claim 1, where the at least one parameter in said step of monitoring is temperature.

3. A process according to claim 1, where the at least one combustion chamber is the secondary combustion chamber.

4. A process according to claim 1, where the at least one combustion chamber is the primary combustion chamber.

5. A process according to claim 1, where the at least one parameter in said step of monitoring is the concentration of carbon monoxide.

6. A process according to claim 5, where the at least one combustion chamber is the secondary combustion chamber.

7. A process according to claim 1, where the at least one parameter in said step of monitoring is the concentration of oxygen.

8. A process according to claim 7, where the at least one combustion chamber is the secondary combustion chamber.

9. A process according to claim 1, wherein the means for controlling the amount of cooled gases are valves.

10. A process according to claim 1, where the oxygen content of the inlet gases is at least about 80 vol. %.

11. A process according to claim 1, where the oxygen content of the inlet gases is at least about 90 vol. %.

12. A process according to claim 1, where the oxygen content of the inlet gases is between about 90 vol. % and 95 vol. %.

13. A process according to claim 1, where said step of burning in the primary combustion chamber is effected at a temperature from about 1100° C. to about 2000° C.

14. A process according to claim 1, where said step of burning in the primary combustion chamber is effected at a temperature from about 1200° C. to about 1750° C.

15. A process according to claim 1, where said step of burning in the primary combustion chamber is effected at a temperature from about 1300° C. to about 1500° C.

16. A process according to claim 1, further comprising the step of adding at least one reduced nitrogen compound into the second combustion chamber to destroy nitrogen oxide gases.

17. A process according to claim 16, wherein the at least one reduced nitrogen compound is ammonia or urea.

18. A process according to claim 1, further comprising the step of separating solid particulates from the flue gases after the gases are cooled.

19. A process according to claim 1, wherein the at least one combustion chamber of said step of returning is the primary combustion chamber.

20. A process according to claim 19, wherein said step of burning of combustible material produces flames and the cooled flue gases are returned to the primary combustion chamber above the flames in that chamber.

21. A process according to claim 1, where the combustible material is waste.

22. A process according to claim 21, where the combustible material is hazardous waste.

23. A process according to claim 1, where the combustible material is a fuel.

24. A process according to claim 1, where the oxygen content of the inlet gases is between about 95 vol. % and about 100 vol. %.

25. A process for incinerating combustible material including the steps of:
    delivering combustible material and inlet gases to a primary combustion chamber, the inlet gases having an oxygen content of at least 50 vol. %;
    burning the combustible material with the oxygen of the inlet gases in the primary combustion chamber producing flue gases and solid particulates as thermal decomposition products of the burnt combustible material;
    passing the flue gases and particulates to a secondary combustion chamber where further combustion occurs;
    cooling the flue gases exiting the secondary combustion chamber;
    returning a portion of the cooled flue gases to at least one of the combustion chambers where the cooled gases moderate the temperature in the at least one chamber; and
    passing the remaining portion of cooled flue gases on to a flue gas purification system where pollutants in the flue gases and particulates are substantially converted to benign compounds or removed entirely before the flue gases are emitted into the atmosphere,
    wherein the inlet gases of said step of delivering are delivered in two high concentration oxygen streams, one inlet gas stream positioned adjacent to the burning combustible material and the other above the flames of the burning combustible material, the amount of oxygen from each stream controlled so that the temperature of the burning combustible material is maintained at a temperature that does minimal damage to the floor of the primary combustion chamber, while ensuring substantially complete combustion of the combustible material and an oxygen volume % in the system's effluent within regulatory limits.

26. A process for incinerating combustible material including the steps of:
    delivering combustible material and inlet gases to a primary combustion chamber, the inlet gases having an oxygen content of at least 50 vol. %;
    burning the combustible material with the oxygen of the inlet gases in the primary combustion chamber producing flue gases and solid particulates as thermal decomposition products of the burnt combustible material;
    passing the flue gases and particulates to a secondary combustion chamber where the combustion occurs at a temperature from about 850° C. to about 1500° C.;
    cooling the flue gases exiting the secondary combustion chamber;
    returning a portion of the cooled flue gases to at least one of the combustion chambers where the cooled gases moderate the temperature in the at least one chamber; and
    passing the remaining portion of cooled flue gases on to a flue gas purification system where pollutants in the flue gases and particulates are substantially converted to benign compounds or removed entirely before the flue gases are emitted into the atmosphere.

27. A process according to claim 26, where the combustion in the secondary combustion chamber in said step of passing the flue gases is effected at a temperature from about 950° C. to about 1350° C.

28. A process according to claim 27, where the combustion in the secondary combustion chamber in said step of passing the flue gases is effected at a temperature from about 1050° C. to about 1200° C.

29. A system for incinerating waste, the system including:
    a primary combustion chamber in which waste, delivered from a source of waste, is burned to produce flue gases and solid particulates;
    first and second gas inlets for providing inlet gas streams into said primary combustion chamber, both of said inlets providing inlet gas streams having an oxygen content of at least 50 vol. %, where said first gas inlet provides inlet gases adjacent to the waste in said chamber and where said second gas inlet provides inlet gases above the flames of the burning waste;
    a secondary combustion chamber in flow communication with said primary combustion chamber for burning non-combusted or partially combusted flue gases and solid particulates arriving from said primary combustion chamber;
    a heat exchanger in flow communication with said secondary combustion chamber for cooling flue gases arriving from said secondary chamber;
    a particulate separator for separating solid particulates from the flue gases arriving from said secondary combustion chamber;
    means for controlling the portion of the cooled flue gases to be recirculated back to said at least one of said combustion chambers, said means for controlling in flow communication on the upstream side with said heat exchanger and in flow communication on the downstream side with at least one of said combustion chambers, said recirculated cooled flue gases cooling the temperatures in at least one of said chambers; and a flue gas purification system in communication with said means for controlling the portion of the cooled flue gases, said purification system purifying the flue gases not recirculated back into at least one of said combustion chambers.

30. A system according to claim 29, wherein said means for controlling is valves.

31. A system according to claim 30 further including a control system to monitor a parameter in at least one combustion system and accordingly activating said valves so as to control the portion of cooled flue gases returned to at least one of said combustion chambers.

32. A system according to claim 31 wherein said at least one of said chambers is said primary combustion chamber.

33. A system according to claim 31 wherein said at least one of said chambers is said secondary combustion chamber.

34. A system according to claim 29 wherein said primary and secondary chambers are part of a single unit, said chambers positioned distant from one another so that their operation and control are independent of each other.

35. A process for incinerating combustible material including the steps of:

delivering combustible material and inlet gases to a primary combustion chamber, the inlet gases having oxygen content of at least 50 vol. %;

burning the combustible material with the oxygen of the inlet gases in the primary combustion chamber producing flue gases and solid particulates as thermal decomposition products of the burnt combustible material;

passing the flue gases and particulates to a secondary combustion chamber where further combustion occurs;

cooling the flue gases exiting the secondary combustion chamber;

returning a portion of the cooled flue gases to the secondary combustion chamber where the cooled gases moderate the temperature in the secondary combustion chamber; and passing the remaining portion of cooled flue gases on to a flue gas purification system where pollutants in the flue gases and particulates are substantially converted to benign compounds or removed entirely before the flue gases are emitted into the atmosphere.

* * * * *